US012789356B1

(12) United States Patent
Kukuruda

(10) Patent No.: US 12,789,356 B1
(45) Date of Patent: Nov. 10, 2026

(54) AUTOMATIC MARKING DEVICE

(71) Applicant: Edward Kukuruda, Freeport, PA (US)

(72) Inventor: Edward Kukuruda, Freeport, PA (US)

( * ) Notice: Subject to any disclaimer, the term of this patent is extended or adjusted under 35 U.S.C. 154(b) by 325 days.

(21) Appl. No.: 18/589,514

(22) Filed: Feb. 28, 2024

Related U.S. Application Data

(60) Provisional application No. 63/448,784, filed on Feb. 28, 2023.

(51) Int. Cl.
*G01B 3/12* (2006.01)
*B25H 7/04* (2006.01)

(52) U.S. Cl.
CPC *B25H 7/04* (2013.01); *G01B 3/12* (2013.01)

(58) Field of Classification Search
CPC ............... B25H 7/00; B25H 7/04; G01B 3/12
USPC .................................................... 33/772–782
See application file for complete search history.

(56) References Cited

U.S. PATENT DOCUMENTS 2,604,700 A * 7/1952 Berthiez .................. G01B 7/00 33/778
2,741,031 A * 4/1956 Martin, Jr. ............... G01B 3/12 33/781
2,777,208 A * 1/1957 Skraban ................... B25H 7/04 33/41.6
2,947,084 A * 8/1960 Billings ................ E04F 21/165 33/41.6
3,286,351 A * 11/1966 Mcalister ................. B25H 7/04 30/263
3,295,215 A * 1/1967 Simons .................. G01B 5/043 226/100
3,537,394 A * 11/1970 Swapp ..................... B25H 7/04 101/103
3,968,568 A * 7/1976 Jackson ................ G01M 3/005 235/96
4,276,695 A * 7/1981 Stansbury, Jr. .......... G01B 3/12 33/781
4,372,049 A * 2/1983 Hogue ..................... B43K 8/00 101/328
5,038,492 A * 8/1991 Bryant ................ E04G 21/1891 156/577
5,255,561 A * 10/1993 Fleming ................. G01B 7/345 73/146
5,302,207 A * 4/1994 Jurcisin ................... E01C 23/22 118/305
5,749,522 A * 5/1998 Smrt .................... B65D 83/184 239/150
5,943,785 A * 8/1999 Kondo ............... G01D 5/34723 33/780
6,035,542 A * 3/2000 Woznow .................. G01C 7/04 33/775

(Continued)

*Primary Examiner* — George B Bennett
(74) *Attorney, Agent, or Firm* — The Law Office of Austin Bonderer, PC; Austin Bonderer

(57) ABSTRACT

An automatic marking device can mark lumber at important positions for use in construction. The automatic marking device has a body, one or more rotating elements, a distance counter, and a marking apparatus. The one or more rotating elements and the marking apparatus are coupled to the body. The one or more rotating elements are able to move the marking device along a first element and/or a second element. The distance counter determines the distance traveled by the marking device. At predetermined locations, the marking device will apply indicators to the first element and/or the second element.

19 Claims, 4 Drawing Sheets

(56) References Cited

U.S. PATENT DOCUMENTS

| | | | | |
|---|---|---|---|---|
| 7,089,679 | B2 * | 8/2006 | Brown | G01B 3/12<br>33/775 |
| 8,479,407 | B2 * | 7/2013 | Nepil | G01B 3/12<br>33/772 |
| 11,319,717 | B1 * | 5/2022 | Kukuruda | E04G 21/1841 |
| 12,263,572 | B1 * | 4/2025 | Conklin | B25H 7/04 |
| 2006/0042112 | A1 * | 3/2006 | Nepil | G01B 3/12<br>33/772 |
| 2009/0217542 | A1 * | 9/2009 | Watkins | B65D 83/386<br>33/775 |

* cited by examiner

AUTOMATIC MARKING DEVICE

FIELD

The subject matter herein generally relates embodiments disclosed herein are beneficial to many fields, including construction.

BACKGROUND

Currently, a tape measure, a square, a level, a pencil, and in many cases, a costly assistant are needed to accomplish layout or framing tasks. The tape measure and pencil are often misplaced at the job site, and time is wasted trying to locate them. The tape measure usually requires a second person to assist with the measuring and marking of layout or framing projects. If attempting such projects without assistance, the tape measure end frequently slips off the end of the board that is being measured. Pencil marks are often not able to be seen in the parts of lumber with dark sections. Many people are not skilled in the math required for measuring 12 inches (30.48 centimeters), 16 inches (40.64 centimeters) and 24 inches (60.96 centimeters) on center markings over a long distance and/or in a quick manner. Tape measures are often held in place by stepping on it to hold it stable, but this can break the tape measure or cause the end to slip off the material being measured. Pencil points often break, resulting in a scramble on a job site to sharpen the pencil. Pencil marks often do not stand out on wood/lumber construction materials.

An immense amount of time is used when measuring for window and door headers and stud locations because of continually having to pull out the tape measure for every measurement. The process creates fatigue and tedious work strain from continued bending up and down throughout the day, which leads to faulty measurements and loss of time and material. Generally, one person is trying to measure and mark for multitudes of procedures resulting in wasted time and material. Improper measurements cause electricians, plumbers, architects, designers, interior decorators, and laymen, to place their object in an undesired location.

BRIEF DESCRIPTION OF THE DRAWINGS

Implementations of the present technology will now be described, by way of example only, with reference to the attached figures, wherein.

DETAILED DESCRIPTION

Figure 1:
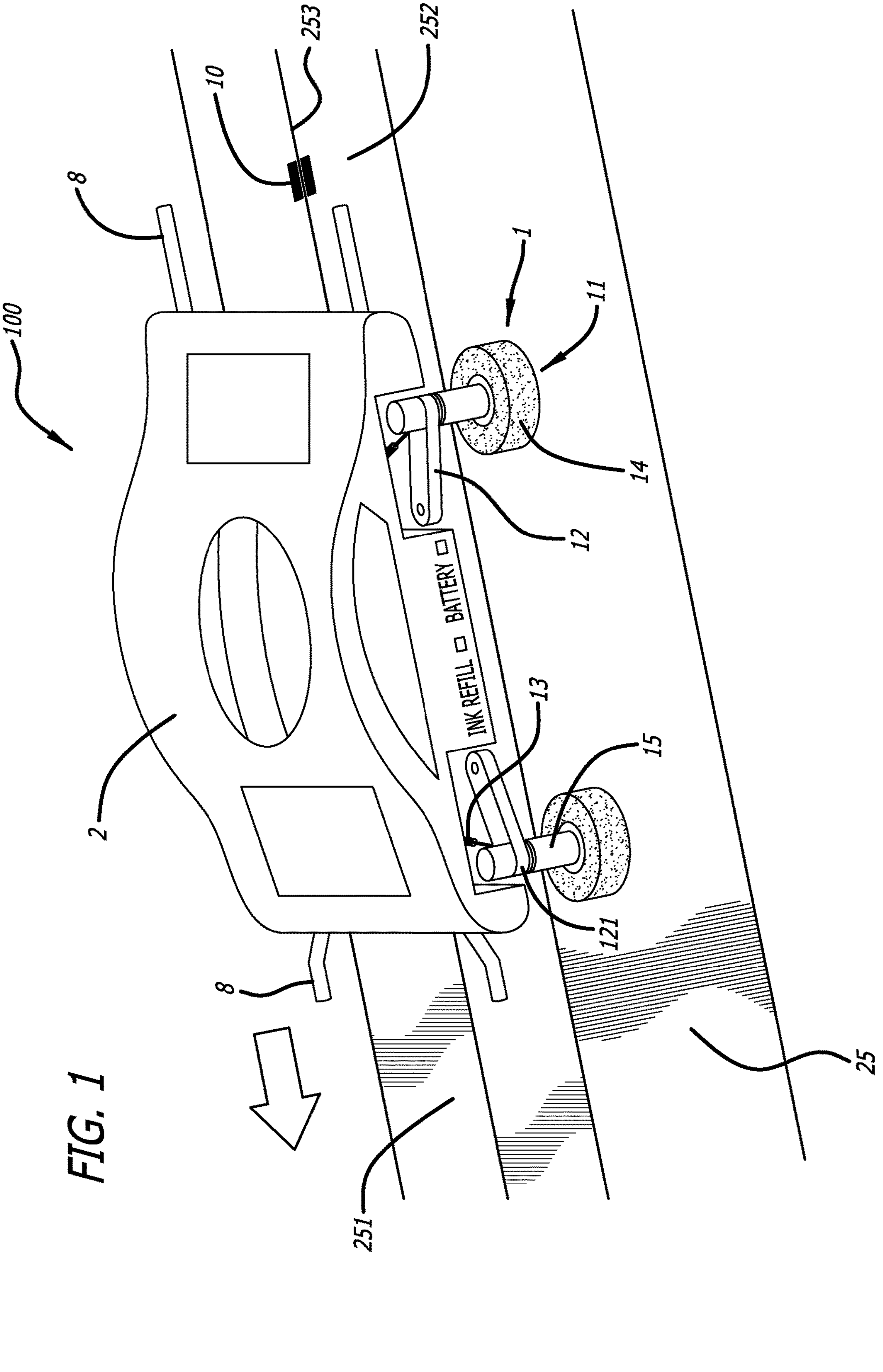
FIG. 1 shows an embodiment of the marking device in use.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "electrically coupled" is defined as being in structural electrical contact, whether directly or indirectly through intervening components, to allow the flow of electrons between the respective elements. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" in relation to quantitative measurements (unless otherwise stated) includes, but is not limited to, the disclosed measure and measurements about the disclosed measure in terms of its disclosed degree. For example, "about 90" would at least include 80-100, whereas "about 90.0" would at least include 89.0-91.0. The term "comprising" means "including, but not necessarily limited to"; it specifically indicates open-ended inclusion or membership in a so-described combination, group, series and the like.

The present disclosure is described in relation to a marking device 100 to be used in the pre-framing construction, however the marking device 100 can be used in any number or environments.

FIG. 1 illustrates an embodiment of the marking device 100. In some embodiments, the marking device 100 comprises a rotating element 1 and a marking apparatus 6. In some embodiments, the marking device 100 comprises a housing 2. In some embodiments, the marking device 100 comprises one or more arms 8.

Figure 2:
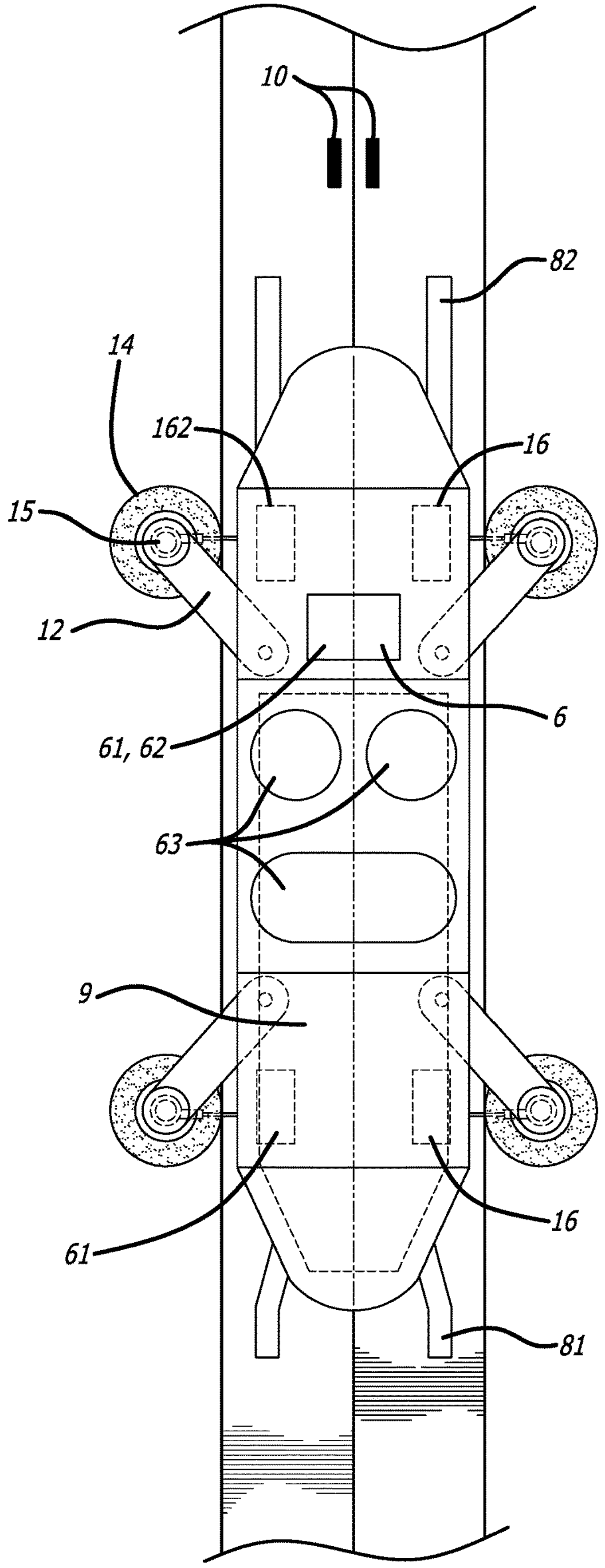
FIG. 2 shows an embodiment of the marking device.

FIG. 2 illustrates an embodiment of the marking device 100 comprising a rotating element 1, a marking apparatus 6, and one or more arms 8. In some embodiments, the rotating element 1 comprises an exterior rotating element 11, an interior rotating element 16, or a combination thereof. In some embodiments, the exterior rotating element 11 comprises an exterior engagement member 14, an exterior engagement arm 12, an exterior connection member 13, an exterior tensioner 132, or a combination thereof. In some embodiments, the exterior engagement arm 12 is coupled to a height adjustment member 15. In some embodiments, the exterior engagement arm 12 is rotatably coupled to the marking device body 9 and actuated by the exterior connection member 13. In some embodiments, the heigh adjustment member 15 is configured to change the distance of the exterior engagement member 14 relative to the marking device body 9. In some embodiments, the height adjusting member 15 can raise the exterior engagement member 14 above the element 25, such that the exterior engagement member 15 cannot engage the side of the element 25 and lower the exterior engagement member 14 below the edge of the element 25 so that the exterior engagement member 15 can at least partially, if not fully, engaged the element 25. The range of motion of the height adjusting member 15 can be set as desired. In some embodiments, the exterior engagement member 14 is coupled to the exterior engagement arm 12. The exterior engagement arm 12 is rotationally coupled to the marking device body 9 and coupled to the exterior connection member 13, and the exterior connection member 13, and/or the exterior engagement member 14, is coupled to the exterior tensioner 132. In some embodiments, the exterior engagement member 14 is pulled against and element 25, or released therefrom, when the exterior tensioner 132 is actuated. In some embodiments, there are two opposing exterior engagement members 14 and when the exterior tensioner 132 is actuated, it applies tension to the two exterior engagement members 14. In some embodiments, the exterior engagement member 14 comprises a wheel. In some embodiments, one or more of the exterior engagement members 14 provide some or all of the propulsion for the marking device 100. In some embodiments, the exterior engagement members 14 comprise an exterior configured to grip lumber. In some embodiments, the exterior engagement members 14 comprise of rubber, spikes, projections, grit, tread, or a combination thereof, to grip the sides of the element 25.

In some embodiments, the interior rotating elements 16 can be powered, act as distance determining elements, or a combination thereof. In some embodiments, one or more of the interior rotating elements 16 will act as a distance measurement element. As such, as the marking device 100 moves along the elements 25, one or more of the interior rotating elements 16 will rotate and the distance of the movement can be calculated. This distance can be use to determine the placement of the indicators 10. In some embodiments, some or all of the interior rotating elements 16 are powered and able to move the marking device 100. In some embodiments, the interior rotating elements 16 can be controlled such that slippage of one or more of the interior rotating elements 16 is sensed and/or prevented. In some embodiments, the marking device 100 will take into account all information from two or more of the interior rotating elements 16 to make a decision about applying an indicator 10 and/or if it is too far out of parameters to continue.

In some embodiments, the exterior tensioner 132 actuates by rotating, and it either draws the exterior connection member 13 toward the marking device 100 or provides slack for the exterior connection member 13. In some embodiments, the exterior tensioner 132 is capable of making near instantaneous adjustments to account for variations on the side walls of the element 25.

In some embodiments, the exterior engagement arms 12 are biased toward the marking device body 9 and the exterior connection member 13 will push the engagement arms 8 away from the marking device body 9 when it is time to release from the element 25.

In some embodiments, the exterior connection member 13 comprises a linear member, a wire, a cable, a spring, or a combination thereof. In some embodiments, the exterior connection member 13 comprises a shock absorber to help adjust for disturbances during the operation of the marking device 100.

In some embodiments, the interior rotating element 16 comprises one or more rotating elements 160. In some embodiments, there are at least three interior rotating elements 16. In some embodiments, the interior rotating element 16 comprises one or more front rotating elements 161 and one or more rear rotating elements 162. In some embodiments, the one or more of the interior rotating elements 16 are capable of moving independently of each other and/or in concert with each other.

In some embodiments, the marking apparatus 6 comprises a first marking element 61 and a second marking element 62. The first marking element 61 is able to apply a marking out of the first side of the marking device 100, and the second marking apparatus 6 is able to apply a marking out of the second side of the marking device 100. When the marking device 100 is located on a first element 251 and a second element 252, the first marking element 61 is able to mark the first element 251 and the second marking element 62 is able to mark the second element 252. In some embodiments, the first element 251 and the second element 252 have substantially the same thickness. In some embodiments, the first element 251 and the second element 252 are lumber. In some embodiments, the first element 251 and the second element 252 are a 2×4, a 2×6, or a combination thereof. In some embodiments, the first element 251 and the second element 252 create a line at their meeting 253.

In some embodiments, the marking device 100 comprises one or more marker chambers 63. The one or more marker chambers 63 is in communication with the marking apparatus 6 such that marker from the one or more marker chambers 63 is able to be delivered to the marking device 100. Each marker chamber 63 is configured to store a marker. In some embodiments, one or more marker chambers 63 are configured to store one or more colors of markers. In some embodiments, the marker chambers 63 are in communication with each other. In some embodiments, the size of the marker chambers 63 vary.

In some embodiments, the arms 8 comprise one or more front arms 81, one or more rear arms 82, or a combination thereof. In some embodiments, the marking device 100 comprises sensors, and in some embodiments, the sensors comprise one or more rear sensors, one or more front sensors, one or more center sensors, or a combination thereof. In some embodiments, one or more of the arms 8 comprise sensors that are configured to detect the ends, meeting 253, the edges, and/or sides of the element(s) 25. In some embodiments, one or more of the sensors are configured to detect the meeting 253 of two elements 25. In some embodiments, the rear arms 82 comprise rear sensors that are able to detect the end, the edges, and/or sides of the element(s) 25 as the marking device 100 along the element(s) 25. In some embodiments, the front arm 81 comprises a front sensor capable of sensing the end of the element(s) 25 to prevent the marking device 100 from moving forward off the element(s) 25. In some embodiments, the marking device 100 comprises one or more centering sensors capable of sensing the line created by the meeting 253 of the two elements 25 when they are placed together. In some embodiments, the rotating element 1 will be adjusted by the information obtained by the sensors. As an example, a sensor indicates that the marking device 100 is veering to one side outside of tolerances, and the rotating elements 1 will adjust the speed of one side to correct the path.

In some embodiments, sensors will detect the end of the elements 25 and/or a junction of another element (e.g. a framing “T”).

In some embodiments, when the marking device 100 encounters a junction, the user will remove the marking device 100, make a measurement from the last indicator 10, align the marking device 100 on the measurement past the junction, and restart the marking device 100. In some embodiments, the marking device 100 will have one or more buttons indicating the length of the measurement from the junction. In some embodiments, the marking device 100 will have a section that is to be aligned with the measurement.

In some embodiments, the marking device 100 comprises one or more sensors configured to detect the edges, surfaces, the meeting 253, and/or sides of the element(s) 25 so that the marking device 100 will maintain a desired position, for example in the center, while moving on the element(s) 25. In some of these embodiments, the marking device 100 will not need or have the use of the exterior rotating element 11 as the sensors and the interior rotating element 16 will keep the marking device 100 on the desired path. In some embodiments, one or more of the exterior engagement members 14, one or more of the exterior engagement arms 8, one or more of the exterior rotating element 11, or a combination thereof, comprise, and/or coupled to, a sensor.

Figure 3:
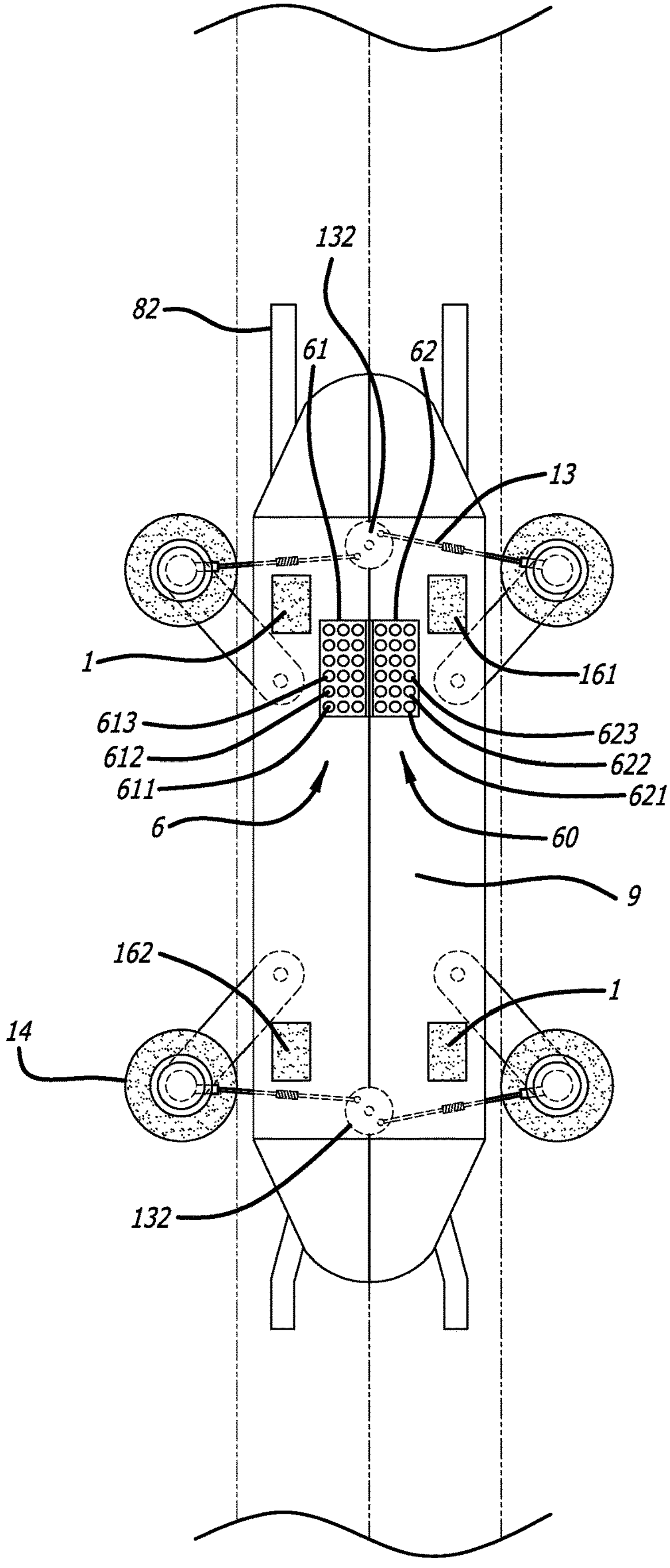
FIG. 3 shows an embodiment of an underside of an embodiment of the marking device.

FIG. 3 illustrates an underside of an embodiment of the marking device 100. In some embodiments, the marking apparatus 6 comprises an output 60. In some embodiments, the output 60 defines columns 600 (e.g. 611 and 621). In some embodiments, the columns 600 define a continuous opening, segmented openings, or a combination thereof. In some embodiments, the segmented openings define a column of circles. It is to be understood that the number of columns 600, the number of segments, the length of the openings, the length of the output 60, or a combination thereof, can be determined as desired. In some embodiments, the segmented openings can be used like a dot-matrix printer to output text, shapes and/or symbols. In some embodiments, some or all of a column will be used to output marker. In some embodiments, each column will have a specific marker color associated with column. For example, in some embodiments, the columns 611 and 621 have direct communication with a marker chamber 63 housing a first color marker, the columns 612 and 622 have direct communication with a marker chamber 63 housing a second color, and the columns 613 and 623 have direct communication with a marker chamber 63 housing a third color. In some embodiments, every column is in communication with every marker chamber 63. In some embodiments, the output 60 will be at least the width of a 2×4 or a 2×6 (e.g. the 4 of the 2×4). In some embodiments, the output 60 will be able to vary the length of an indicator 10 according to a setting on the marking device 100. For example, a user may want to switch between working with 2×6s and 2×4s, and the indicator 10 would be adjusted for the desired element(s) 25. In some embodiments, columns 611 and 621 will apply indicators 10 at 12 inches (30.48 centimeters) on center; columns 612 and 622 will apply indicators 10 at 16 inches on center; and columns 613 and 623 will apply indicators 10 at 24 inches (60.96 centimeters) on center. In some embodiments, the indicators 10 for 12 inches (30.48 centimeters) on center, 16 inches (40.64 centimeters) on center, and 24 inches (60.96 centimeters) on center will be of different colors. In some embodiments, the indicator 10 for each of the different measurements can span across the different columns 600 and/or using different colors.

Figure 4:
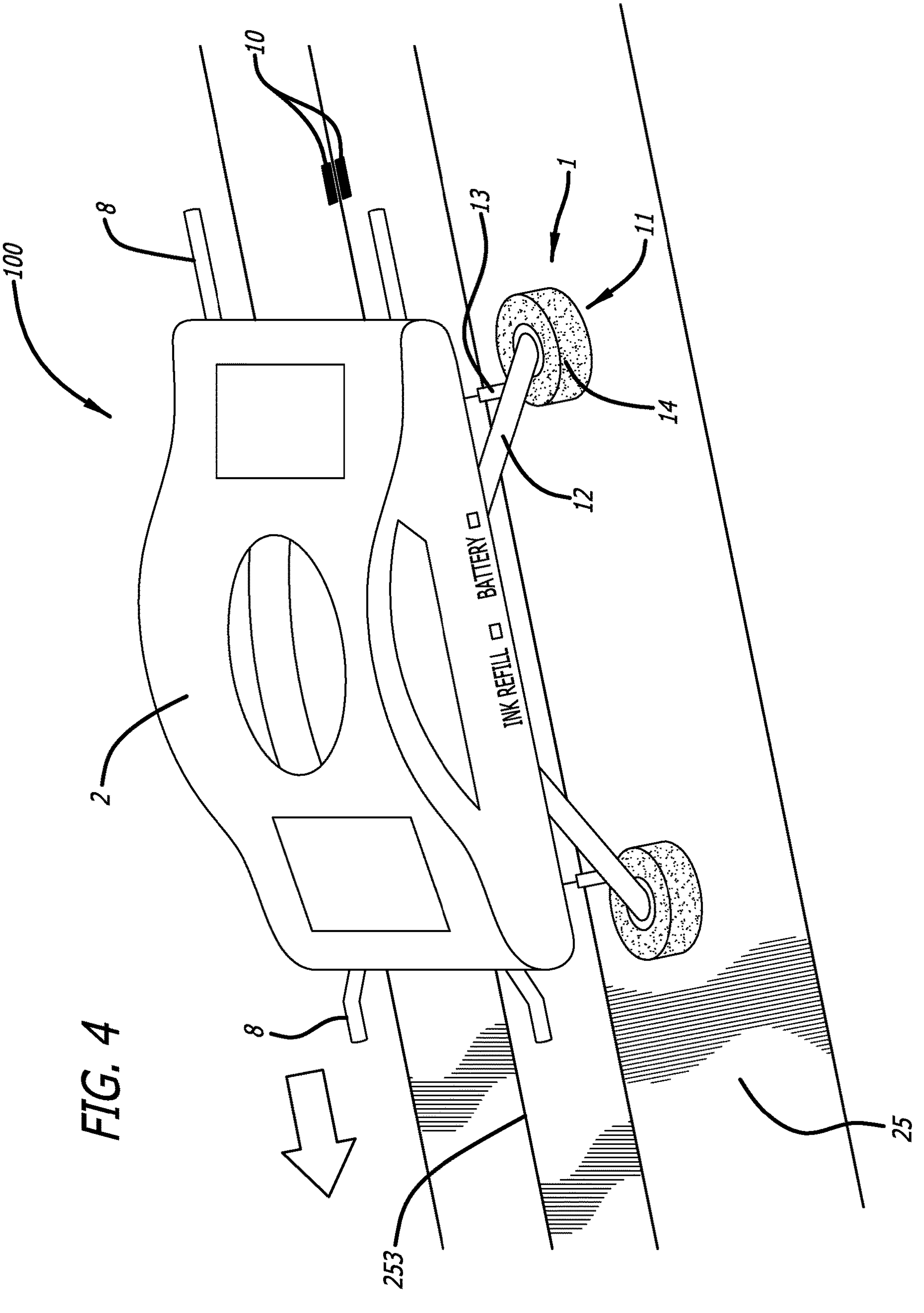
FIG. 4 shows an embodiment of the marking device.

FIG. 4 shows an embodiment of the marking device 100 wherein the exterior engagement arm 12 is angled from the marking device body 9 and does not employ a height adjustment member 15.

In some embodiments, the marking device 100 is configured to self-align itself on one or more elements 25. The self-alignment is done after a user places the marking device 100 on one or more elements 25. In some embodiments, the marking device 100 is able to move to determine the edges one or more elements 25 and center itself along the width, reverse itself to verify the ends of the element(s) 25, that the ends of multiple elements 25 are lined up within a predetermined tolerance, or a combination thereof.

During use, the marking device 100 is used to apply indicators 10 to the one or more elements 25 (e.g. lumber). In some embodiments of the method, the user will place two elements 25 side-by-side and align at least the first edge thereof. The user will place the marking device 100 on the elements 25. In some embodiments of the method, the user will align the marking device 100 with the first edges. In some other embodiments of the method, the marking device 100 will reverse until a rear sensor detects the first edges and/or center itself on the elements 25. It is to be understood that in some embodiments, the marking device 100 can move forward and in reverse, as needed, until the marking device 100 is centered and the first edge(s) is determined.

In some embodiments, before or after placement on the one or more elements 25, the marking device 100 was instructed by the user (e.g. Bluetooth interface, manual settings, electrically coupled device) as to the one or more indicators 10 that are to be applied at certain distances (e.g. 12 inches (30.48 centimeters), 16 inches 16 inches (40.64 centimeters) and/or 24 inches (60.96 centimeters)). The marking device 100 will start moving along the one or more elements 25. In some embodiments, one or more of the sensors will provide constant or systematic feedback to provide for adjustments as needed. Once the marking device 100 reaches a predetermined distance from the first edge, the marking apparatus 6 will apply an indicator 10 to each element 25. In some embodiments, the marking apparatus 6 will apply the indicator 10 while the marking device 100 is moving. In some embodiments, the indicator 10 will have a predetermined length and the application of the indicator 10 will be applied such that the center of the indicator 10 will be at the predetermined distance. In some embodiments, the one or more indicators 10 will comprise, text, shapes, symbols, lettering, lines, differing colors for different predetermined lengths, or a combination thereof.

It is to be understood that the predetermined lengths need not be limited to set reoccurring distances. In some embodiments, the user is able to upload instructions such that the marking device 100 is instructed to apply an indicator 10 a predetermined distances at regular intervals in addition to a special marking that is only to be applied at one or more specific distances from the edge. For example, the marking device 100 is instructed to apply indicators 10 at 24 inches (60.96 centimeters) on center and one or more indicators 10, which are distinguished from the indicators 10 at 24 inches (60.96 centimeters) on center, for the placement of other items (e.g. windows).

In some embodiments, the marking device 100 is able to process an entire plan for a structure. The marking device 100 would be able to mark with indicators 10 that would also include a labeling of the element 25 (e.g., A1) and, if needed according to plan, a cut indication. As such, the marking element can be run over multiple elements 25, label the element 25, and place all the required indicators 10 according to the plan, including cut instructions. When that is completed the user would only need to look at the labels and the plan to know how to construct the structure. In use, the user will bring the elements 25 to the worksite and run each of the elements 25 with the marking device 100. The marking device 100 will create markings and identify each member of the plan. For example, the marking device 100 will run the first element 251 and dissect it into three different members by labeling each member and indicating where the user is to cut the element 25 in two locations. The labeling will identify the member and let the user know where it goes in relation to the plan. In some embodiments, the members will not be produced sequentially, but produced in such a way as to minimize waste of the elements 25.

In some embodiments of the method, the marking device 100 will approach and sense the second edge of one or more of the elements 25. The marking device 100 will make adjustments as needed to prevent the marking device 100 from progressing off the second end. In some embodiments of the method, the marking device 100 will provide an alert to the users via sound, vibration, visual, application notification, or a combination thereof once finished.

In some embodiments of the method, during the progression of the marking device 100, one or more of the sensors will take readings of the one or more elements 25, determine the quality of the one or more elements 25, detect imperfections of one or more elements 25, or a combination thereof. In some embodiments of the method, one or more sensors can determine if one of the elements 25 is warped. In some embodiments of the method, the marking device 100 is configured to, in response to a sensor reading of a defect to apply an indicator 10 to identify the location of defect. In some embodiments of the method, the indicator 10 can indicate the severity of the defect detected (e.g. colors to indicate the severity of the defect). In some embodiments of the method, the marking device 100 will indicate by audible, visual, notification by an application, or a combination thereof if a serious enough defect is found.

In some embodiments of the method, the user will place the marking device 100 on one or more elements 25. The one or both of the exterior tensioners 132 actuates to tighten the exterior engagement members 14 against the sides of the one or more elements 25 such that it will center the marking device 100 on the one or more elements 25.

In some embodiments of the method, the method comprises one or more of the following steps:

A) reversing on two elements 25 to determine the first edges of the two elements 25
B) confirming the first edges are aligned with each other within a predetermined tolerance;
C) progressing forward on the two elements 25;
D) determining a location on the two elements 25 that is preset distance from the edges;
E) marking the determined location with an indicator 10;
F) reaching the end of at least one of the two elements 25 or marking a predetermined number of indicators 10.

In some embodiments of the method, the method comprises one or more of the following steps:

A) reversing on an elements 25 to determine the first edge of the element 25;
B) progressing forward on the element 25;
C) determining a location on the two elements 25 that is preset distance from the edges;
D) marking the determined location with an indicator 10;
E) reaching the second edge;
F) stopping.

In some embodiments of the method, the method comprises one or more of the following steps:

A) progressing forward one or more elements 25;
B) determining one or more locations on the element 25 according to a predetermined distance; and
C) marking the one or more locations with an indicator 10.

In some embodiments of the method, the method comprises one or more of the following steps:

A) finding a first edge of one or two elements 25;
B) progressing forward on the one or two elements 25;
C) determining a location on the two elements 25 that is preset distance from the first edge;
D) marking the determined location with an indicator 10;

In some embodiments of the method, the method comprises one or more of the following steps:

A) finding a first edge of one element 25;
B) progressing forward on the elements 25;
C) determining a location on element 25 that is preset distance from the first edge; and
D) marking the determined location with an indicator 10;

In some embodiments of the method, the method comprises one or more of the following steps:

A) finding the first edge of two adjacent elements 25;
B) detecting the meeting 253 were the two adjacent elements 25 meet;
C) aligning with the meeting 253;
D) progressing forward on the elements 25 along the meeting 253 a preset distance;
E) marking each element 25 with a first indicator 10 at the preset distance; and applying a second indicator 10 on each element 25 a preset distance from the first indicator 10.

In some embodiments of the method, the method comprises one or more of the following steps:

A) abutting a side of each element 25 with an exterior engagement member 14
B) reversing on two elements 25 to determine the first edges of the two elements 25
C) confirming the first edges are aligned with each other within a predetermined tolerance;
D) progressing forward on the two elements 25;
E) determining a location on the two elements 25 that is preset distance from the edges;
F) marking the determined location with an indicator 10;
G) reaching the end of at least one of the two elements 25.

In some embodiments of the method, the method comprises one or more of the following steps:

A) placing the marking device 100 on one or more elements 25;
B) removing the marking device 100 from the one or more elements 25;
C) making a measurement from an indicator 10; and
D) replacing the marking device 100 on the one or more elements 25;
E) wherein the replacing the marking device 100 on the one or more elements 25 comprises placing the marking device 100 on the one or more elements such that a predetermined section aligns with the measurement.

It must be understood that while many items in the construction industry are referred to as a certain size, such as a 2×4, indicating an element 25 that is 2 inches (5.08 centimeters) by 4 inches (10.16 centimeters), have morphed over time to a different size. While this may further change over time, the current standard dimensions for a 2×4 is 1.5 inches (3.81 centimeters) by 3.5 inches (8.89 centimeters). In such a case, the measurements of the embodiments, when dependent upon the measurements of the building material (e.g., the elements 25), will correspond to the actual measurements of the building materials as they are, not how they are named.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:

a marking device comprising:

a body;

two or more rotating elements;

a distance counter; and a marking apparatus;

wherein the two or more rotating elements and the marking apparatus are coupled to the body; at least two of the two or more rotating elements are configured to secure the marking device to a first element and/or a second element; at least one of the two or more rotating elements is configured to move the marking device along the first element; the distance counter is configured to determine a distance traveled by the marking device; and the marking device is configured to apply one or more indicators to a surface of the first element and/or the second element.

2. The apparatus of claim 1, wherein the distance counter is one or more of the two or more rotating elements.

3. The apparatus of claim 1, wherein at least one of the two or more rotating elements comprises the distance counter.

4. The apparatus of claim 1, wherein the at least one of the two or more rotating elements comprise exterior rotating element, and the exterior rotating element is configured to engage an exterior of the first element and/or the second element.

5. The apparatus of claim 4, wherein the marking device further comprises an exterior tensioner, and the exterior tensioner is coupled to the exterior rotating element and capable of moving the exterior rotating element toward the body.

6. The apparatus of claim 1, wherein the marking device is configured to find a starting edge of the first element and/or the second element, move along the first element and/or the second element and keep track of distance traveled from the starting edge, and apply the one or more indicators at one or more preset distances.

7. The apparatus of claim 1, wherein the marking device is configured to center itself on the first element, the second element, or the first element and the second element when adjacent to each other.

8. The apparatus of claim 1, wherein each the two or more rotating elements is coupled to an exterior engagement arm that is angled from and coupled to the body.

9. The apparatus of claim 1, wherein the two or more rotating elements comprise one or more interior rotating elements, one or more exterior rotating elements, or a combination thereof; and one of the two or more rotating elements comprise a counter.

10. The apparatus of claim 9, wherein the marking device is able to move vertically along the first element and/or the second element.

11. The apparatus of claim 1, wherein the marking device further comprises one or more sensors.

12. The apparatus of claim 11, wherein the one or more sensors, either individually or collectively, are configured to sense a meeting of the first element and second element, an edge of the first element and/or the second element, an end of the first element and/or the second element, a cross junction, or a combination thereof.

13. The apparatus of claim 12, wherein the marking device further comprises one or more arms, and each arm has one of the one or more sensors located thereon.

14. The apparatus of claim 1, wherein at least one of the two or more rotating elements operate to detect slippage.

15. The apparatus of claim 1, wherein the marking apparatus is coupled to a marking chamber.

16. The apparatus of claim 1, wherein the marking apparatus comprises an output.

17. The apparatus of claim 16, wherein the output comprises three pairs of columns, and each pair of columns will apply at least one of the one or more indicators in a different color.

18. The apparatus of claim 16, wherein the output is configured to apply the one or more indicators on the first element and/or the second element.

19. The apparatus of claim 1, wherein the marking apparatus is configured to apply one or more indicators at predetermined locations; wherein the predetermined locations comprise 12 inches (30.48 centimeters) on center marking, 16 inches (40.64 centimeters) on center marking, 24 inches (60.96 centimeters) on center marking, or a combination thereof; and the one or more indicators comprise labeling, text, cut marking, text, shapes, symbols, lettering, lines, colors, or a combination thereof.

* * * * *